Figure 1:
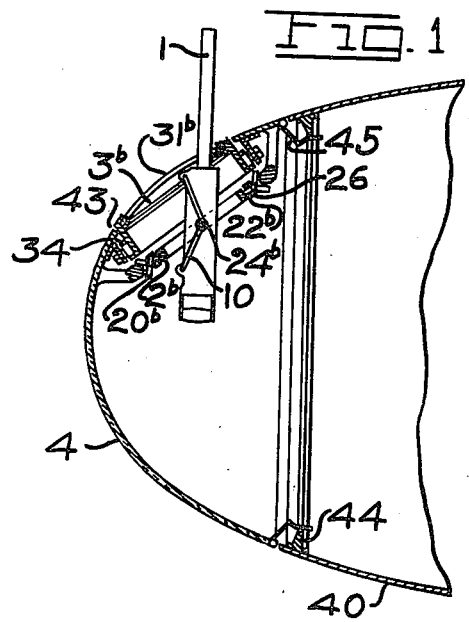

Inventor
John C. Sanders
By Charles L. Reynolds
Attorney

July 4, 1939. J. C. SANDERS 2,164,722
AIRCRAFT GUN MOUNT AND FLUSH PROTECTIVE SHIELD THEREFOR
Original Filed Oct. 17, 1934 2 Sheets-Sheet 2
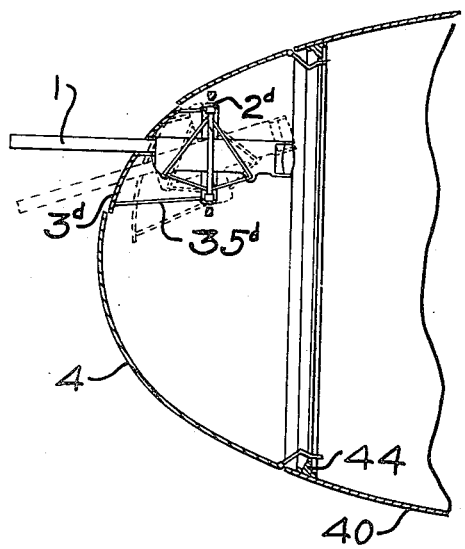
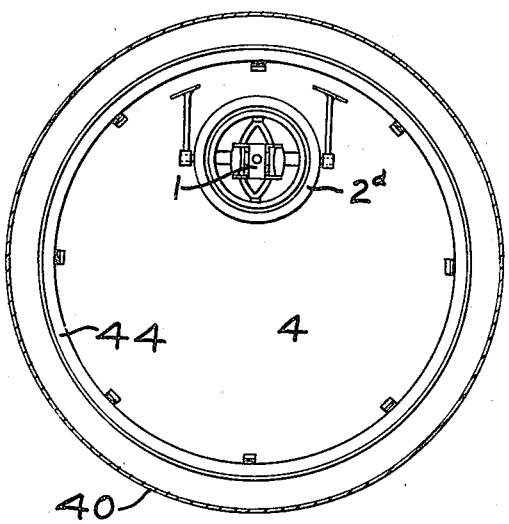
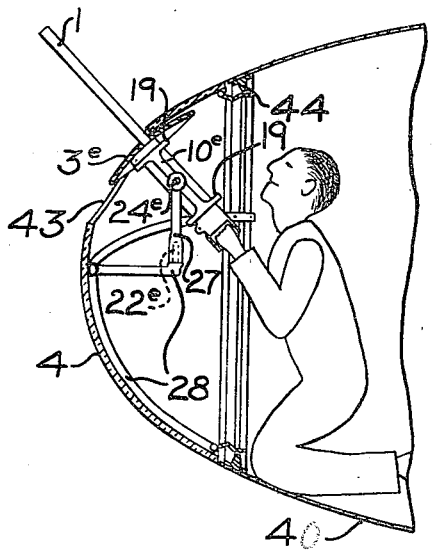
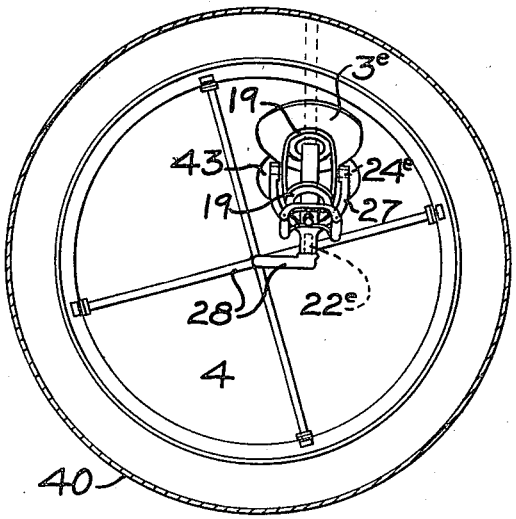
Inventor
John C. Sanders
By Charles L. Reynolds
Attorney Patented July 4, 1939

2,164,722

UNITED STATES PATENT OFFICE 2,164,722

AIRCRAFT GUN MOUNT AND FLUSH PROTECTIVE SHIELD THEREFOR

John C. Sanders, Seattle, Wash., assignor to Boeing Aircraft Company, Seattle, Wash., a corporation of Washington Original application October 17, 1934, Serial No. 749,040. Divided and this application December 21, 1936, Serial No. 116,918

18 Claims. (Cl. 89—37.5)

My invention relates to a gun mount of the enclosed type for use upon aircraft, and more particularly for installation in airplanes, preferably of the type to support machine guns.

This application is a division from my application Serial No. 749,040, filed October 17, 1934 which has matured into Patent Number 2,113,143.

My gun mount is of the type in which a protective enclosure is provided for both the gun mount and the gunner, to protect them from the air stream flowing past the aircraft. Especially is my invention advantageous for use in a gun emplacement formed as a continuation of an aircraft body, such, for example, as in the nose of an airplane fuselage.

It is the principal purpose of my invention to provide a gun emplacement of this general type, having as nearly as possible a streamline contour, so that the air resistance of the airplane will not be appreciably increased by the gun installation. Armament may thus be provided upon very high speed bombing airplanes, for example, without detrimentally affecting the speed of the airplane to an appreciable extent.

It is a more specific object to provide a gun installation in the rounded nose of an airplane, for example, of a type such that the only projecting part of the assembly is the gun barrel, and further so that the rounded contour of the nose is not altered by reason of the gun enclosure shape.

In an installation of this type, however, it is also an object of my invention to afford an unusually extensive field of fire for the gun, although, with the exception of the barrel, the gun, its mount, and the gunner, are all enclosed from the airstream, both for the protection of the gunner and to minimize the air resistance.

Other objects and the particular manner in which I propose to accomplish the aforementioned objects will become apparent from the description of the specification read with the accompanying drawings in mind.

While my invention is illustrated in the drawings and described in the specification in representative embodiments, it is to be borne in mind that the forms shown are primarily to illustrate the principles of my invention, and adaptation of the ideas incorporated therein to other forms will occur to those skilled in the art, the characteristic features being defined in the claims appended hereto.

The drawings illustrate the novel features of my invention in characteristic installations, denoting feasible suggested constructions. All these are shown in the form of gun emplacements at the terminus of an aircraft body.

Figure 2:
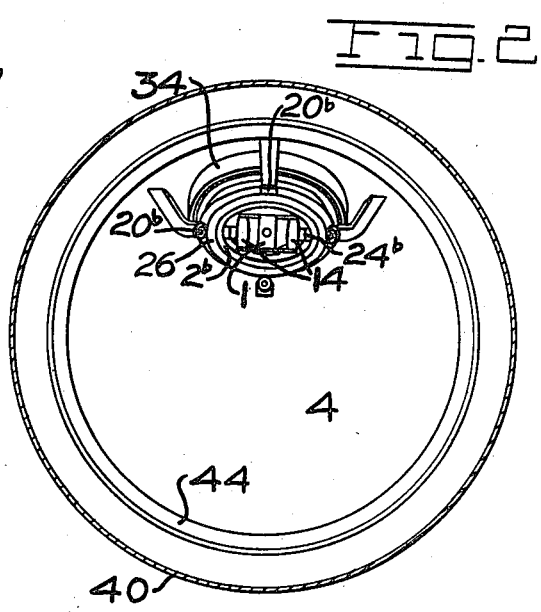

Figure 1 is a longitudinal section, and Figure 2 a transverse section from the inside looking forward of a gun installation in the nose portion of an airplane fuselage.

Figure 3:
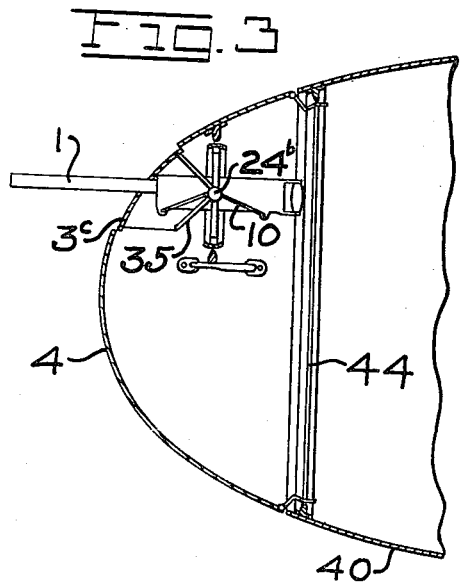
Figure 4:
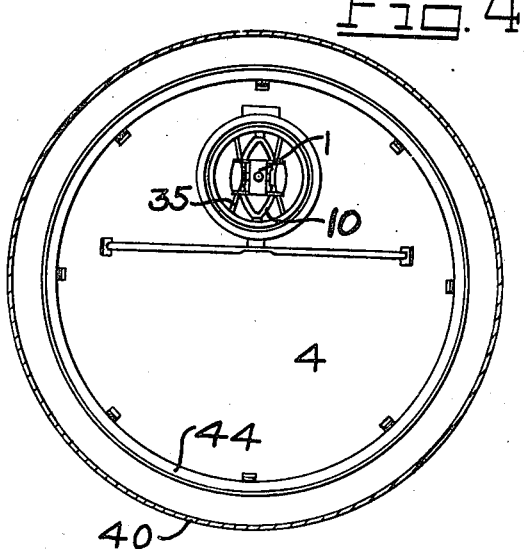

Figures 3 and 5 are sections corresponding to Figure 1 of two modified forms of a gun installation, and Figures 4 and 6 are sections corresponding to Figure 2, illustrating, respectively, the modified forms of Figures 3 and 5.

Figures 7 and 8 are longitudinal and transverse sections, respectively, corresponding respectively to Figures 1 and 2 of still a further modification.

A principal common characteristic of all the forms shown in the drawings is the provision of a gun shield, employed to close an opening in an aircraft structure through which a gun projects, of a contour substantially identical with the local contour of the aircraft structure. By this I mean that the gun shield closing the aperture through which the gun projects is of substantially the same shape as would be the aircraft structure were the opening for the gun not provided, but instead the fuselage were made of continuous streamline shape; the gun shield blends with the surface of the aircraft structure surrounding the aperture.

Specifically I have shown my gun installation in the nose of an airplane fuselage. Ordinarily such a nose would be bullet-shaped, having an approximately circular cross section. For projection of a gun an aperture might be formed eccentrically of the longitudinal axis of the fuselage in a surface generally inclined with respect to such longitudinal axis, and yet not normal to such axis. When such an aperture, of a size to enable elevational and traversing movement of a gun projecting therethrough, is provided I preserve the original streamline contour of the fuselage by forming a shield to surround the gun barrel closely. Such shield is of a size to close the aperture provided, and of a contour to form a substantially unbroken continuation of the bullet shape of the nose.

While a gun projecting through such an aperture, when universally mounted would fire through a considerable field, I prefer that this field be increased by employing a construction to afford orbital movement of the eccentrically disposed gun, gun mount, gun shield, and aperture closed thereby, about the longitudinal axis of the fuselage. Thus a gun 1 may project through an aperture 43 located in a shell 4, which forms the nose of the fuselage, in a position eccentric of the longitudinal fuselage axis and the axis of the shell 4. Orbital movement of the gun and opening 43 is then accomplished by supporting the shell 4 rotatively with respect to the airplane body 40, as upon a track 44.

In a gun emplacement of the general type described, the gun mount itself and the shield closing the aperture 43 may take various forms and be supported in different ways. In Figures 1 and 2 the gun 1 is tiltably mounted upon the axis 24$^b$ upon the ring 2$^b$, which in turn is swingable with relation to the ring 26 upon an axis 22$^b$ at right angles to the axis 24$^b$, and the ring 26 in turn is rotatable in a circular path defined by rollers 20$^b$, which path is inclined to the axis of the shell 4 and disposed generally parallel to the aperture 43. Within the aperture 43 is rotatably supported an enclosure or shield 3$^b$, having merely a slot for the projection therethrough of the gun barrel, preferably of a width just sufficient to enable such projection, this enclosure being rotatably guided in a track 34 for rotation in a plane generally parallel to the plane defined by the several rollers 20$^b$ and the aperture 43. The gun may be swung in the slot 31$^b$ in the shield, and by rotating the gun upon its mounting by grasping the handles 14 it will act as a lever, in swinging at an angle to the slot 31$^b$, to rotate the shield 3$^b$. By such rotation the diametrically disposed slot 31$^b$ may be disposed in a vertical plane, either parallel to the direction of flight, transversely thereof, or at any intermediate angle thereto. Thus the shield 3$^b$ may form in effect a part of the streamlined structure of the shell 4, yet the gun may be given elevational and traversing movement with respect to the shell throughout a wide field by movement within the shell aperture 43, and by rotation of the shell itself, combined with movement of the gun, the gun may be given a field of fire on all sides of the fuselage, as well as forward thereof, aggregating substantially a hemisphere forward of a plane normal to the direction of flight through the gun mount.

Any suitable means for supporting the shell 4 and guiding it for rotation with respect to the fuselage 40 may be provided, such, for example, as disclosed in my aforementioned application Serial No. 729,040. For instance, rollers may be supported on brackets 45 to contact with the opposite sides of tracks 44. Swinging of the gun about the pivots 24$^b$ and 22$^b$ would afford universal movement over the entire aperture 43, but since it is preferable that the gun be maintained in an upright position for all swung positions of the gun and rotative positions of the shell 4 the rotatable ring 26 should be provided. If in any particular installation it is not necessary that the gun be maintained upright, one of the pivots 22$^b$ and 24$^b$ might be eliminated, and universal movement of the gun throughout the slot 43 could still be accomplished by swinging it about only the remaining one of these axes, accompanied by rotation of the ring 26.

A somewhat similar arrangement is illustrated in Figures 3 and 4, the chief difference being that the enclosure or shield, designated 3$^c$ to distinguish it, is not rotatably mounted, but is carried by arms 35, connected directly to the gun mount 10, and therefore it is tilted and traversed by corresponding movement of the gun. In this form the shield 3$^c$ lies just inside the shell 4, and while it substantially closes the streamline aperture of the shell when the gun is in the position shown in Figure 3, it would leave a gap when tilted unless it were extended farther than is shown in order to close such a gap. It will be noted that both the shield 3$^c$ and the gun mount 10 tilt about the normally horizontally disposed axis 24$^b$. This pivot is received in a ring which in turn is supported from the shell 4 upon a vertical pivot, and again both the shell 3$^c$ and the gun mount 10 will swing conjointly about this vertical pivot. In this form also, if it is desired to maintain the gun in an upright position for all rotative positions of the shell 4, suitable means would be provided to enable the gun 1 to rotate about its axis and with respect to the gun mount and shield 3$^c$.

In Figures 5 and 6 a modification of the idea shown in Figures 3 and 4 is illustrated, where the shield, designated 3$^d$ in order to distinguish it, is supported by arms 35$^d$ from the ring 2$^d$. This ring is tiltable upon an axis parallel to the shell aperture 43, and to the base of the shell 4, which axis may be considered as normally horizontal, as shown in Figure 6, but the ring is not tiltable about a normally vertical axis at right angles to the horizontal axis, although the gun is swingable about such a vertical axis to traverse it along the normally horizontal slot formed in the shell 3$^d$. Therefore while the shield 3$^d$ is depressed or elevated by movement of the gun, being supported on the tiltable ring 2$^d$, the gun swings laterally with respect to the shield 3$^d$, the slot in the latter being of sufficient extent to permit a considerable traversing movement of the gun, and being of a width just sufficient for projection of the gun barrel therethrough, so that the gun mount and the gunner, stationed on the portion of the fuselage 40 adjacent to the base of the shell, will be protected from the air stream to a maximum degree. Likewise in this form, if it be desirable, provision may be made for rotation of the gun 1 about its longitudinal axis to maintain it upright for all rotative positions of the shell 4, in addition to its swinging movement about the two above-mentioned axes.

In the form shown in Figures 7 and 8 the gun mount 10$^e$ is provided with two bearings 19 within which the gun is received for rotation about its own axis, and to the gun or its immediate mount is fixed the shield 3$^e$, which in at least one position of the gun substantially fills the aperture 43 in the shell. The mount is tiltable about an axis 24$^e$ upon a post 27, which in turn is rotatable about an axis 22$^e$ placed off center from the axis of rotation of the shell 4. This post is mounted on a framework, generally designated 28, supported either from the shell or upon the track 44, as may be preferred.

In all these forms it will be evident that the portion of the fuselage 40 adjacent to the base of the shell constitutes the gunner's support rather than the shell 4, so that he need not shift his own stance as he rotates the shell to accomplish orbital movement of the gun mount, aperture 43, and the gun projecting therethrough. As illustrated in Figure 7, the gunner may assume a kneeling posture in the aircraft fuselage, and from that position may train the gun in any direction throughout the field of fire.

It will be appreciated that the outstanding advantage inherent in a gun installation of this type is the ability of a gun to be trained throughout a wide field of fire by a gunner who is almost perfectly shielded from the air stream under normal conditions, while at the same time the streamline contour of the fuselage and especially the nose thereof is maintained of the same desirable shape and substantially unbroken, as it would be were no gun emplacement provided, the only added resistance being that created by the projecting gun barrel.

The illustrations of the drawings are largely diagrammatic, in that structural details have been omitted or indicated only in a general way. In any of the forms such portions of the shell 4 and fuselage 40 as deemed desirable may be made of transparent material to afford the requisite visibility for the gunner without providing unprotected openings in the aircraft structure for this purpose.

What I claim as my invention is:

1. In an aircraft structure terminating in a circular opening extending transversely of the direction of flight, a terminal shell of substantially hemispherical shape disposed with its base closing such opening in streamlined continuation of the aircraft structure, and having an eccentric aperture therein between its dome and its base, means guiding said shell for rotation with respect to the aircraft structure about an axis normal to said opening through the center thereof, a gun mount supported directly upon said shell and adapted to support a gun projecting through the shell aperture for elevational and traversing movement with respect to the shell, and a shield of a size and so disposed as to close said shell aperture, and of a contour substantially identical with the local shell contour, and apertured for projection therethrough of a gun supported by said gun mount.

2. In an aircraft structure having an opening therein, a curved shell closing such opening, means guiding said shell for rotation with respect to the aircraft structure, said shell having therein an aperture disposed eccentrically of the shell's rotative axis, pivot means supported from said shell in a position generally parallel to the aircraft structure opening and to the shell aperture, a ring carried by said pivot means, a slotted gun shield, of a size to close said shell aperture and of a contour substantially identical with the local shell contour, supported by said ring adjacent to the shell aperture to swing relatively thereto, a second ring within and pivoted upon said first ring on an axis normal to said pivot means, and a gun mount supported from said second ring to swing therewith, and adapted to support a gun projecting through the shield slot for traversing therealong.

3. In an aircraft structure having an opening therein, a substantially hemispherical shell rotative about its base, received in such opening and projected from such base to effect a streamline continuation of the aircraft structure, means guiding said shell for rotation about an axis disposed normal to the base through its center, said shell having an aperture therein between its dome and its base, a gun mount supported directly upon said shell and adapted to support a gun projecting through the shell aperture for movement with respect to the shell, and a gun shield, of a size to close said shell aperture and of a contour substantially identical with the local shell contour, apertured for projection therethrough of a gun, and supported from said gun mount for conjoint movement therewith.

4. In an aircraft structure having an opening therein, a substantially hemispherical shell having its base received in such opening, means guiding said shell for rotation about an axis disposed normal to the base through its center, said shell having an aperture therein between its dome and its base, a frame received within and of contour corresponding to said shell, an arm projecting inward at an angle to the shell's axis from that portion of said frame adjacent to the shell's dome, pivot means mounted on the inner end of said arm, a bracket supported on said pivot means, pivot means, normal to said first pivot means, carried by said bracket, a gun mount carried by said second pivot means and adapted to support a gun projecting through the shell aperture, and a gun shield, of a size to close said shell aperture and of a contour substantially identical with the local shell contour, apertured for projection therethrough of a gun, and supported from said gun mount for conjoint movement therewith.

5. In a truncated but otherwise streamlined aircraft structure the plane of the truncation of which is substantially transverse to the longitudinal axis of the aircraft structure, said aircraft structure having an opening therein at the base of the truncation, a shell in the form of a body of revolution about an axis that is substantially coaxial with the longitudinal axis of the aircraft structure, the shell closing said opening and being shaped to extend in smooth streamlined continuation of the aircraft structure, in all positions of revolution about such axis, means guiding said shell for rotation with respect to the aircraft structure, an aperture in said shell, a gun mount so supported with relation to said shell as to support a gun projecting through the shell aperture, and a shield of a size and disposition to close said shell aperture and of a contour substantially identical with the local shell contour.

6. In a truncated but otherwise streamlined aircraft structure having an opening therein at the base of the truncation, a shell in the form of a body of revolution shaped to close such opening and extending in smooth continuation of the aircraft structure, and combining therewith to complete its streamline form, the shell having an aperture therein, a gun mount supported directly upon said shell and adapted to support a gun projecting through such aperture for elevational and traversing movement with respect to the aircraft structure, a shield of a size and disposition to close said shell aperture, and of a contour substantially identical with the local shell contour, and apertured for projection therethrough of a gun supported by said gun mount, and means, independent of said gun and gun mount, supporting said shield from the aircraft structure.

7. An aircraft structure having an opening therein; a rotative shell, supported and guided for rotation from the aircraft structure, closing said opening, and having a circular aperture therein disposed eccentrically of its rotative axis; a circular gun shield disk, of a contour substantially identical with the local shell contour, received and guided within said aperture, for rotation relatively to the shell about an axis perpendicularly through the center of said disk, the disk being diametrically slotted for projection therethrough of a gun; a gun mount to support a gun projecting through the shield disk slot, means, independent of the disk supporting means, supporting and guiding said mount for swinging about two axes, both normal to the gun barrel's axis, and normal to each other, one such axis being generally parallel to said disk, for traversing movement along the shield disk slot, the rotation of the shell with respect to the aircraft structure affording orbital movement to the gun shield about the longitudinal axis of said shell.

8. In an aircraft structure having an opening therein, a dome-like shell closing such opening and guided on the structure for relative rotation about an axis through its dome and the center of its base, and having an aperture therein disposed eccentrically of its axis, a gun shield of a contour substantially identical with the local shell contour, closing such aperture, a gun mount to support a gun projecting through the aperture and gun shield, to swing in traverse and elevation from a position substantially parallel to the shell's axis, the gun mount and shield moving orbitally about the shell's axis, upon rotation of the shell relatively to the structure.

9. In an aircraft structure having an opening therein, a dome-like shell closing such opening and guided on the structure for relative rotation about an axis through its dome and the center of its base, and having an aperture therein disposed eccentrically of its axis, a gun shield of a contour substantially identical with the local shell contour, closing such aperture, a gun mount to support a gun projecting through the aperture and gun shield, to swing in traverse and elevation from a position substantially parallel to the shell's axis, the gun mount and shield moving orbitally about the shell's axis, upon rotation of the shell relatively to the structure, and means incorporated in the gun mount for rotation of the gun about its own axis, whereby the gun may be maintained upright during orbital movement.

10. A two-part aircraft structure comprising a nose portion and a tail portion, formed as a body of revolution of general ogival shape as a whole, the nose portion being joined to the tail portion along a plane transverse to the longitudinal generating axis of the structure, and guided on the tail portion for rotation relative to the latter about such axis, the nose portion having an aperture, a gun mount so flexibly supported with relation to the nose portion as to support a gun for projection and aiming through such aperture, and a shield of a size and disposition to close said aperture in all positions of the gun, and of a contour substantially identical with the local nose contour, whereby the ogival shape of the structure as a whole is always maintained.

11. In a truncated but otherwise streamlined aircraft structure having an opening therein at the base of the truncation, a shell in the form of a body of revolution shaped to close such opening and extending in smooth continuation of the aircraft structure, and combining therewith to complete its streamline form, said shell having an aperture therein, means guiding said shell for rotation with respect to the aircraft structure, a gun mount supported directly upon said shell and adapted to support a gun projecting through the shell aperture, a shield of a size and disposition to close said shell aperture and of a contour substantially identical with the local shell contour, said aircraft structure constituting a gunner's support, independent of said shell, whereby the gunner is supported in a position adjacent to said shell for operation of the gun supported in said gun mount.

12. In an aircraft structure having an opening therein, a shell closing such opening and having a circular aperture therein, a circular gun shield disk of a contour substantially identical with the local shell contour, received within said aperture and slotted for projection therethrough of a gun, means guiding said disk for rotation with respect to said shell about an axis perpendicularly through the center of said disk, and a gun mount to support a gun projecting through and for swinging along the shield disk slot.

13. In an aircraft structure having an opening therein, a shell closing such opening and having a circular aperture therein, a circular gun shield disk of a contour substantially identical with the local shell contour, received within said aperture and slotted for projection therethrough of a gun, means guiding said disk for rotation with respect to said shell about an axis perpendicularly through the center of said disk, a gun mount to support a gun projecting through the shield disk slot, and means supporting said gun mount for swinging movement of the gun about an axis along the disk slot for all rotative positions of the disk in its aperture, and for movement about an axis normal to its first-mentioned axis.

14. In an aircraft structure having an opening therein, a shell closing such opening and having a circular aperture therein, a circular gun shield disk of a contour substantially identical with the local shell contour, received within said aperture and slotted for projection therethrough of a gun, means guiding said disk for rotation with respect to said shell about an axis perpendicularly through the center of said disk, a gun mount to support a gun projecting through the shield disk slot, a member supported for rotation in a plane parallel to said disk, pivot means mounted on said member to swing about an axis in its plane, and pivot means connected to said first pivot means and swingable about an axis normal thereto, and supporting said gun mount for movement about three axes, for swinging of the gun along the shield disk slot in all rotative positions thereof and for rotation of the gun about its own axis.

15. In an aircraft structure having an opening therein, a shell closing such opening and having a circular aperture therein, a circular gun shield disk of a contour substantially identical with the local shell contour, received within said aperture and diametrically slotted for projection therethrough of a gun, means supporting said disk from the aircraft structure and guiding it for rotation with respect to said shell about an axis perpendicularly through the center of said disk, a gun mount to support a gun projecting through the shield disk slot, and means, independent of the disk supporting means, supporting said gun mount from the aircraft structure and guiding said mount for swinging about two axes, one normal to the gun barrel, and the other normal to the first axis and generally parallel to said disk, for traversing movement of the gun along the shield disk slot for all rotative positions of the disk in its aperture.

16. The combination of claim 15, the gun mount supporting means comprising a ring including an inner part and an outer part relatively rotatable, the outer part being fixed relatively to the aircraft structure, and pivot means interconnected between the inner ring part and the gun mount guiding the latter for its swinging movement.

17. In an aircraft structure having an opening therein, a substantially hemispherical shell rotative about its base received in such opening and projected from such base to effect a continuation of the aircraft structure, means guiding said shell for rotation about an axis disposed normal to the base through its center, said shell having an aperture therein between its dome and its base, a gun mount adapted to support a gun projecting through the shell aperture, two pivot means secured together at right angles to each other, one being disposed always generally parallel to the plane of the edge of the aircraft structure opening and mounted on said shell, and the other being disposed always normal to the longitudinal axis of the gun mount and supporting said gun mount, and a gun shield, of a size to close said shell aperature and of a contour substantially identical with the local shell contour, apertured for projection therethrough of a gun, and supported from said gun mount for conjoint movement therewith.

18. In a truncated but otherwise streamlined aircraft structure, constituting a gunner's support, the plane of the truncation being substantially transverse to the longitudinal axis of the aircraft structure, said aircraft structure having an opening therein at the base of the truncation, a shell in the form of a body of revolution about an axis that is substantially coaxial with the longitudinal axis of the aircraft structure, the shell closing said opening and being shaped to extend in smooth streamlined continuation of the aircraft structure, in all positions of revolution about such axis, means guiding said shell from and for rotation with respect to the aircraft structure, the shell having an aperture, a gun mount so supported with relation to the shell as to support a gun projecting through the shell aperture, for operation by a gunner supported from the aircraft structure, and a closure means of a size and shape, and so disposed, as to close the shell aperture, and to lie wholly within a continuation of the surrounding local shell contour.

JOHN C. SANDERS.